US011886432B2

(12) United States Patent
Frantz et al.

(10) Patent No.: US 11,886,432 B2
(45) Date of Patent: Jan. 30, 2024

(54) MANAGING DATABASE QUERIES USING A DECONSTRUCTED CLOUD DATABASE

(71) Applicant: SIGMA COMPUTING, INC., San Francisco, CA (US)

(72) Inventors: Jason D. Frantz, San Francisco, CA (US); Robert C. Woollen, San Rafael, CA (US); Max H. Seiden, San Francisco, CA (US); James L. Gale, San Francisco, CA (US); Kenneth Truong, Temple City, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 42 days.

(21) Appl. No.: 16/921,464

(22) Filed: Jul. 6, 2020

(65) Prior Publication Data

US 2021/0042310 A1 Feb. 11, 2021

Related U.S. Application Data

(60) Provisional application No. 62/884,932, filed on Aug. 9, 2019.

(51) Int. Cl.
*G06F 16/00* (2019.01)
*G06F 16/2453* (2019.01)
*G06F 16/28* (2019.01)
*G06F 21/62* (2013.01)
*G06F 16/2455* (2019.01)
*G06F 21/31* (2013.01)
*G06F 16/248* (2019.01)

(52) U.S. Cl.
CPC ...... *G06F 16/24542* (2019.01); *G06F 16/248* (2019.01); *G06F 16/24553* (2019.01); *G06F 16/283* (2019.01); *G06F 21/31* (2013.01); *G06F 21/6218* (2013.01)

(58) Field of Classification Search
CPC ............. G06F 16/24542; G06F 16/283; G06F 21/6218; G06F 16/24553; G06F 21/31; G06F 16/248
USPC .................................................. 707/600–899
See application file for complete search history.

(56) References Cited

U.S. PATENT DOCUMENTS

| | | | | |
|---|---|---|---|---|
| 2016/0292167 | A1* | 10/2016 | Tran ................... | G06F 16/24542 |
| 2018/0293275 | A1* | 10/2018 | P ........................ | G06F 16/24542 |
| 2020/0394191 | A1* | 12/2020 | Fender ............... | G06F 16/24542 |
| 2020/0394192 | A1* | 12/2020 | Fender ............... | G06F 16/24542 |

* cited by examiner

*Primary Examiner* — Irete F Ehichioya
*Assistant Examiner* — Shirley D Hicks

(57) ABSTRACT

Managing database queries using a deconstructed cloud database including receiving, by a communications manager of the deconstructed cloud database, a state specification from a client computing system; converting, by a query optimizer of the deconstructed cloud database, the state specification into a query plan comprising a database query targeting an offloaded execution engine; retrieving, by a dispatcher of the deconstructed cloud database, query results from the offloaded execution engine using the database query; and presenting, by the communications manager, the query results to the client computing system.

20 Claims, 7 Drawing Sheets

MANAGING DATABASE QUERIES USING A DECONSTRUCTED CLOUD DATABASE

CROSS-REFERENCE TO RELATED APPLICATIONS

This application is a non-provisional application for patent entitled to a filing date and claiming the benefit of earlier-filed U.S. Provisional Patent Application Ser. No. 62/884,932, filed Aug. 9, 2019.

BACKGROUND

Field of the Invention

The field of the invention is data processing, or, more specifically, methods, apparatus, and products for managing database queries using a deconstructed cloud database.

Description Of Related Art

Modern businesses may store large amounts of data in remote databases within cloud-based data warehouses. This data may be accessed using database query languages, such as structured query language (SQL). Further, manipulating the data stored in the database may require constructing complex queries beyond the abilities of most users.

SUMMARY

Methods, systems, and apparatus for managing database queries using a deconstructed cloud database. Managing database queries using a deconstructed cloud database includes receiving, by a communications manager of the deconstructed cloud database, a state specification from a client computing system; converting, by a query optimizer of the deconstructed cloud database, the state specification into a query plan comprising a database query targeting an offloaded execution engine; retrieving, by a dispatcher of the deconstructed cloud database, query results from the offloaded execution engine using the database query; and presenting, by the communications manager, the query results to the client computing system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
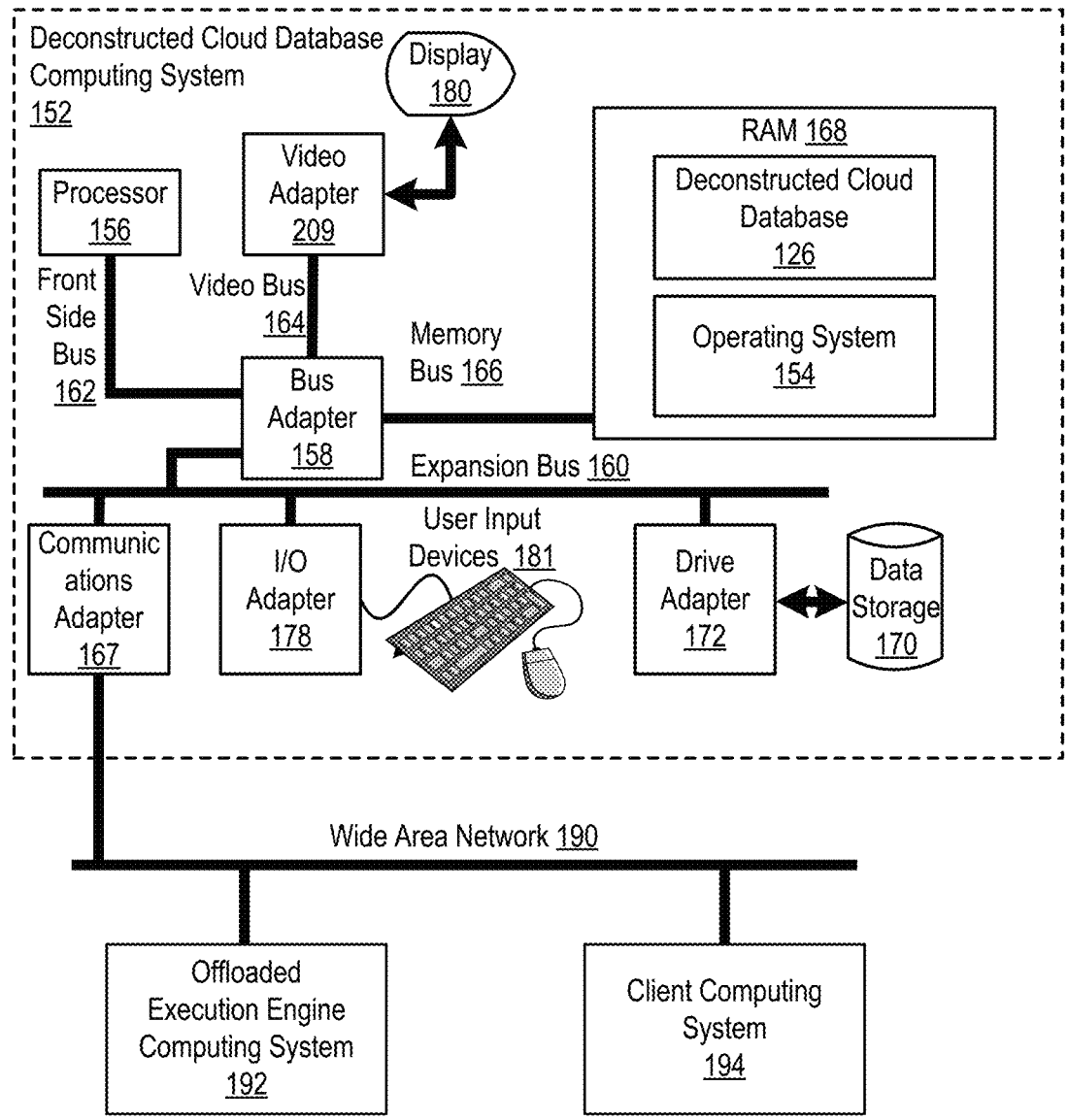
FIG. 1 sets forth a block diagram of an example system configured for managing database queries using a deconstructed cloud database according to embodiments of the present invention.

Exemplary methods, apparatus, and products for managing database queries using a deconstructed cloud database in accordance with the present invention are described with reference to the accompanying drawings, beginning with FIG. 1. FIG. 1 sets forth a block diagram of automated computing machinery comprising an exemplary deconstructed cloud database computing system (152) configured for managing database queries using a deconstructed cloud database according to embodiments of the present invention. The deconstructed cloud database computing system (152) of FIG. 1 includes at least one computer processor (156) or 'CPU' as well as random access memory (168) ('RAM') which is connected through a high speed memory bus (166) and bus adapter (158) to processor (156) and to other components of the deconstructed cloud database computing system (152).

Stored in RAM (168) is an operating system (154). Operating systems useful in computers configured for managing database queries using a deconstructed cloud database according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the deconstructed cloud database (126).

The deconstructed cloud database computing system (152) of FIG. 1 includes disk drive adapter (172) coupled through expansion bus (160) and bus adapter (158) to processor (156) and other components of the deconstructed cloud database computing system (152). Disk drive adapter (172) connects non-volatile data storage to the deconstructed cloud database computing system (152) in the form of data storage (170). Disk drive adapters useful in computers configured for managing database queries using a deconstructed cloud database according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example deconstructed cloud database computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example deconstructed cloud database computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary deconstructed cloud database computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing database queries using a deconstructed cloud database according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes an offloaded execution engine computing system (192) and a client computing system (194). The offloaded execution engine computing system (192) is a computing system or group of computing systems that hosts an offloaded execution engine for access over the wide area network (190). The client system (194) is a computing system that accesses the offloaded execution engine using the deconstructed cloud database (126) on the deconstructed cloud database computing system (152).

Figure 2:
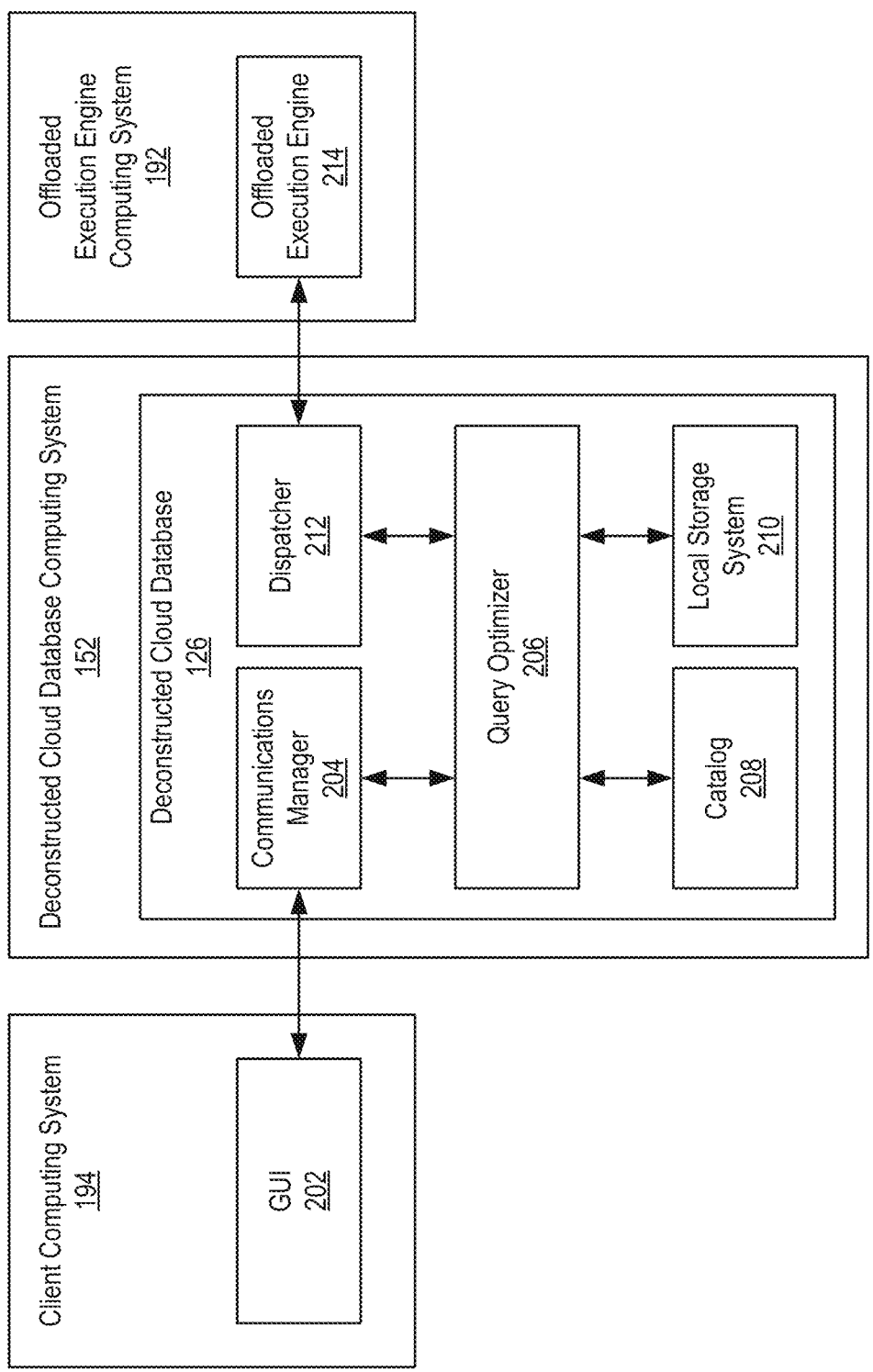
FIG. 2 sets forth a block diagram of an example system configured for managing database queries using a deconstructed cloud database according to embodiments of the present invention.

FIG. 2 shows an exemplary system for managing database queries using a deconstructed cloud database according to embodiments of the present invention. As shown in FIG. 2, the exemplary system includes a client computing system (194), a deconstructed cloud database computing system (152), and an offloaded execution engine computing system (192). The client computing system (194) includes a graphical user interface (GUI) (202), the deconstructed cloud database computing system (152) includes a deconstructed cloud database (126), and the offloaded execution engine computing system (192) includes an offloaded execution engine (214).

The deconstructed cloud database (126) is a collection of elements that coordinate to receive requests in the form of state specifications from the GUI (202) and respond to the received state specifications with a presentation of query results. The deconstructed cloud database (126) is deconstructed in that at least one element of the database is partially or completely offloaded to another separate computing system or group of computing systems. The deconstructed cloud database (126) shown in FIG. 2 includes a communications manager (204), a query optimizer (206), a catalog (208), a local storage system (210), and a dispatcher (212). The deconstructed cloud database (126) shown in FIG. 2 does not include an execution engine. Rather, the execution engine for the database has been offloaded to another computing system.

The communications manager (204) is an interface through which the deconstructed cloud database (126) communicates with the client computing system (194). The communications manager (204) may present the GUI (202) on the client computing system (194) and receive information provided through, and changes made to, the GUI (202) by a user of the client computing system (194) in the form of a state specification. The communications manager (2040 may also present data sets in the form of worksheets to a user of the client computing system (194) via the GUI (202).

The state specification is a collection of data describing inputs into the GUI (202). The state specification may include manipulations of GUI elements within the GUI (202) along with data entered into the GUI (202) by a user of the client computing system (194). Such manipulations and data may indicate requests for and manipulations of data sets. The state specification may be a standard file format used to exchange data in asynchronous browser-server communication. For example, the state specification may be a JavaScript Object Notation specification.

The query optimizer (206) is an aggregation of hardware and software that converts a state specification to a query plan. Specifically, the query optimizer (206) evaluates the state specification and generates a query plan that includes instructions to carry out the requests for and manipulations of data sets from the offloaded execution engine (214) and/or the local storage system (210). The query plan may include query statements, such as SQL statements, and instructions to access data stored in the local storage system (210) of the deconstructed cloud database (126). The query optimizer (206) may be referred to as a query processor or compiler.

The catalog (208) is a collection of metadata describing the tables, views, worksheets, dashboards, and other objects stored in the local storage system (210) of the deconstructed cloud database (126). The catalog (208) may store metadata describing objects on another computing system, such as the offloaded execution engine computing system (192). Further, parts of the catalog itself may be offloaded to another computing system, such as the offloaded execution engine computing system (192).

The local storage system (210) is an aggregation of hardware and software used to store data and objects on the deconstructed cloud database (126). The dispatcher (212) is an aggregation of hardware and software that retrieves query results (422) from the offloaded execution engine (214) using a database query. Specifically, the dispatcher (212) sends the database query to the offloaded execution engine (214) and receives, from the offloaded execution engine (214), the query results. The dispatcher may include a scheduler that queues the database queries and efficiently schedules the database queries.

The offloaded execution engine (214) is an aggregation of hardware and software that receives a portion of a query plan (e.g., database queries) and responds with query results. The offloaded execution engine (214) may be referred to as an offloaded plan executor. The offloaded execution engine (214) may also include synchronization functionality. Specifically, the offloaded execution engine (214) may include a storage location in which data may be stored by and synchronized with the deconstructed cloud database (126).

The offloaded execution engine (214) is offloaded in that the execution engine exists on a separate and distinct computing system or group of computing systems from the deconstructed cloud database (126). The deconstructed cloud database computing system (152) and the offloaded execution engine computing system (192) may be administered by separate and distinct entities. For example, the deconstructed cloud database computing system (152) may be administered by a first entity that provides enhanced access to data stored on a second entity's cloud-based data warehouse such that employees of the second entity access the cloud-based data warehouse through the first entity's deconstructed cloud database (126). The deconstructed cloud database (126) may utilize the cloud-based data warehouse as an offloaded execution engine (214) without modifying or preparing the cloud-based data warehouse for use as an offloaded execution engine.

The offloaded execution engine (214) may be a cloud-based data warehouse. A cloud-based data warehouse is a repository for data accessible over a wide area network. The cloud-based data warehouse may include a database (such as an SQL database) that services query statements from other computing systems over the wide area network. The cloud-based data warehouse may include other elements of a database, such as a catalog, storage system, and query optimizer.

The GUI (202) presents data sets in the form of a worksheet and graphical elements to a client and receives client input from the client. The GUI (202) may be presented, in part, by the communications manager (204) of the deconstructed cloud database (126) and displayed on a client computing system (194) (e.g., on a system display or mobile touchscreen). The query manager client (202) may be an Internet application hosted on the query manager computing system (152) and initiate the presentation of the GUI (202) on the client computing system (194).

Figure 3:
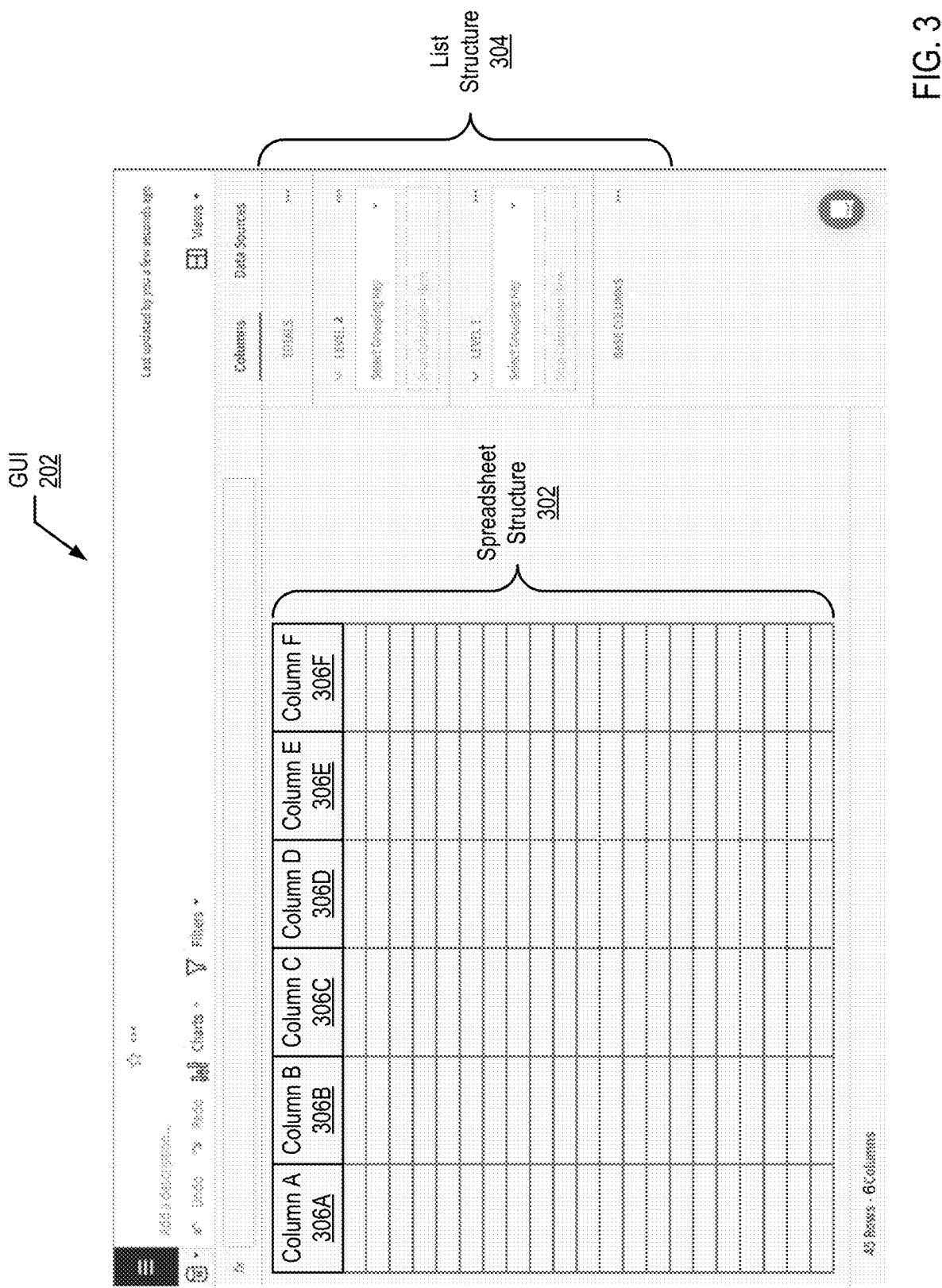
FIG. 3 sets forth a block diagram of an example system configured for managing database queries using a deconstructed cloud database according to embodiments of the present invention.

FIG. 3 shows an exemplary GUI for managing database queries using a deconstructed cloud database according to embodiments of the present invention. As shown in FIG. 3, the exemplary GUI (202) includes a spreadsheet structure (302) and a list structure (304). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculations using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The manipulations of the list structure (304) and the spreadsheet structure (302) as described above may generate a state specification describing the manipulations made a user of the GUI (202). The state specification may then be transmitted to a communications manager of a deconstructed database.

Figure 4:
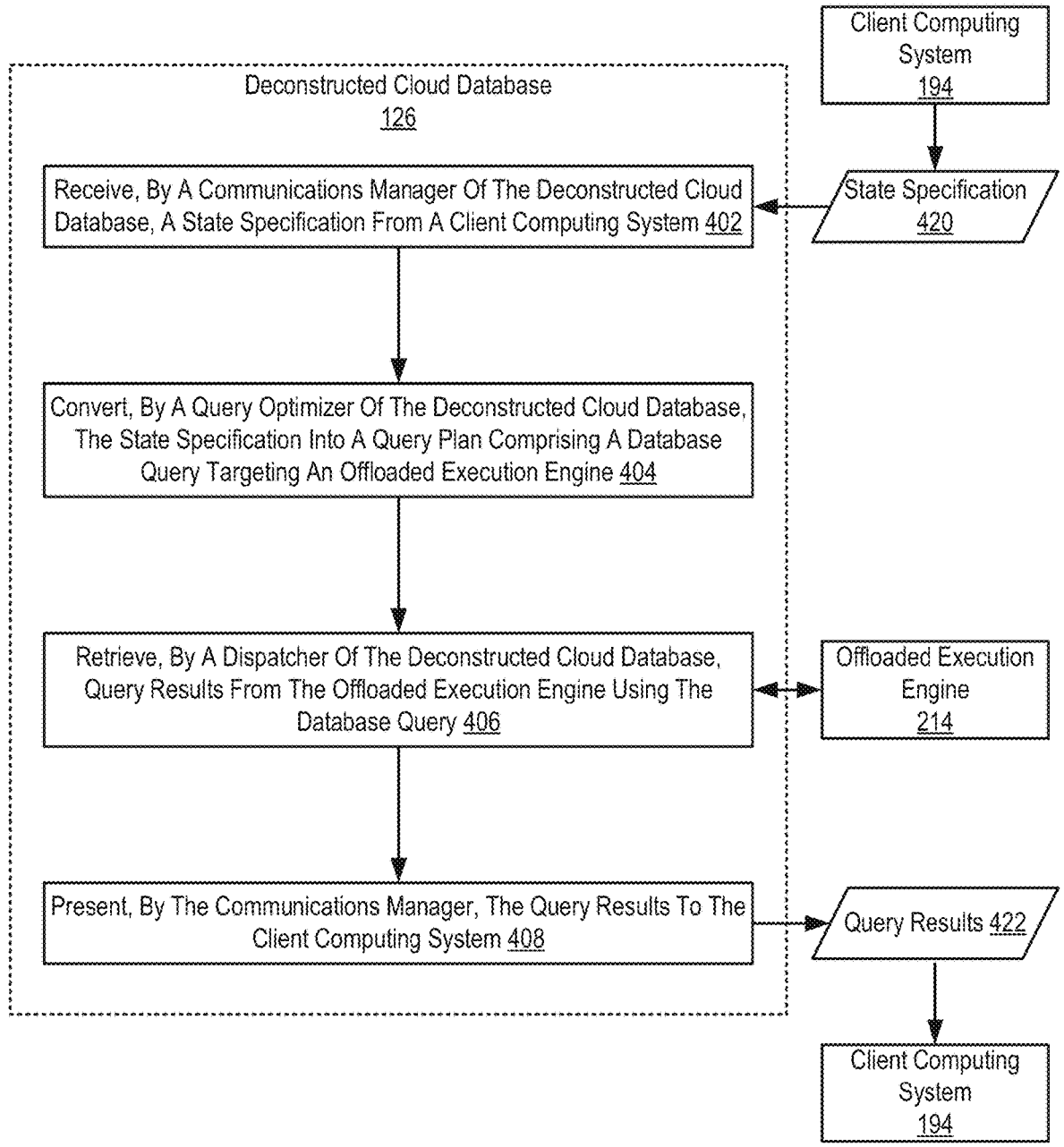
FIG. 4 sets forth a flow chart illustrating an exemplary method for managing database queries using a deconstructed cloud database according to embodiments of the present invention.

For further explanation, FIG. 4 sets forth a flow chart illustrating an exemplary method for managing database queries using a deconstructed cloud database according to embodiments of the present invention that includes receiving (402), by a communications manager of the deconstructed cloud database (126), a state specification (420) from a client computing system (194). Receiving (402), by a communications manager of the deconstructed cloud database (126), a state specification (420) from a client computing system (194) may be carried out by detecting, by the communications manager, that a user has manipulated elements of the GUI and/or submitted data using the GUI such that the generation of a state specification is triggered and the state specification is sent to the communications manager. For example, a user may select a table from a group of tables stored in an offloaded execution engine for display in a worksheet on the GUI. As another example, a user may change the order of columns in the dimensional hierarchy of the GUI.

The method of FIG. 4 further includes converting (404), by a query optimizer of the deconstructed cloud database (126), the state specification (420) into a query plan comprising a database query targeting an offloaded execution engine (214). Converting (404), by a query optimizer of the deconstructed cloud database (126), the state specification (420) into a query plan comprising a database query targeting an offloaded execution engine (214) may be carried out by evaluating the state specification, determining one or more requests indicated in the state specification, and selecting instructions for the query plan that service the requests.

The method of FIG. 4 further includes retrieving (406), by a dispatcher of the deconstructed cloud database (126), query results (422) from the offloaded execution engine (214) using the database query. Retrieving (406), by a dispatcher of the deconstructed cloud database (126), query results (422) from the offloaded execution engine (214) using the database query may be carried out by the dispatcher receiving a subset of the query plan that targets the offloaded execution engine (214) and sending the database query to the offloaded execution engine (214). In response, the dispatcher may then receive the query results (422) from the offloaded execution engine (214).

The method of FIG. 4 further includes presenting (408), by the communications manager, the query results (422) to the client computing system (194). Presenting (408), by the communications manager, the query results (422) to the client computing system (194) may be carried out by the communications manager sending the query results (422) to the client computing system using the GUI. The query results (422) may be presented as a worksheet in the spreadsheet structure of the GUI.

The above steps improve the operation of the computing system by providing database services from a system that utilizes an offloaded execution engine, allowing the elements of the database to be tailored for specific client needs, increasing computing system efficiency and functionality. Using the above-described deconstructed database paradigm, the database can receive requests in the form of state specifications from a user-friendly GUI. Such a state specification can be converted into non-user-friendly database queries and other instructions to service the requests. Therefore, the deconstructed database paradigm provides greater database usability for users, increasing computing system usability and functionality.

Figure 5:
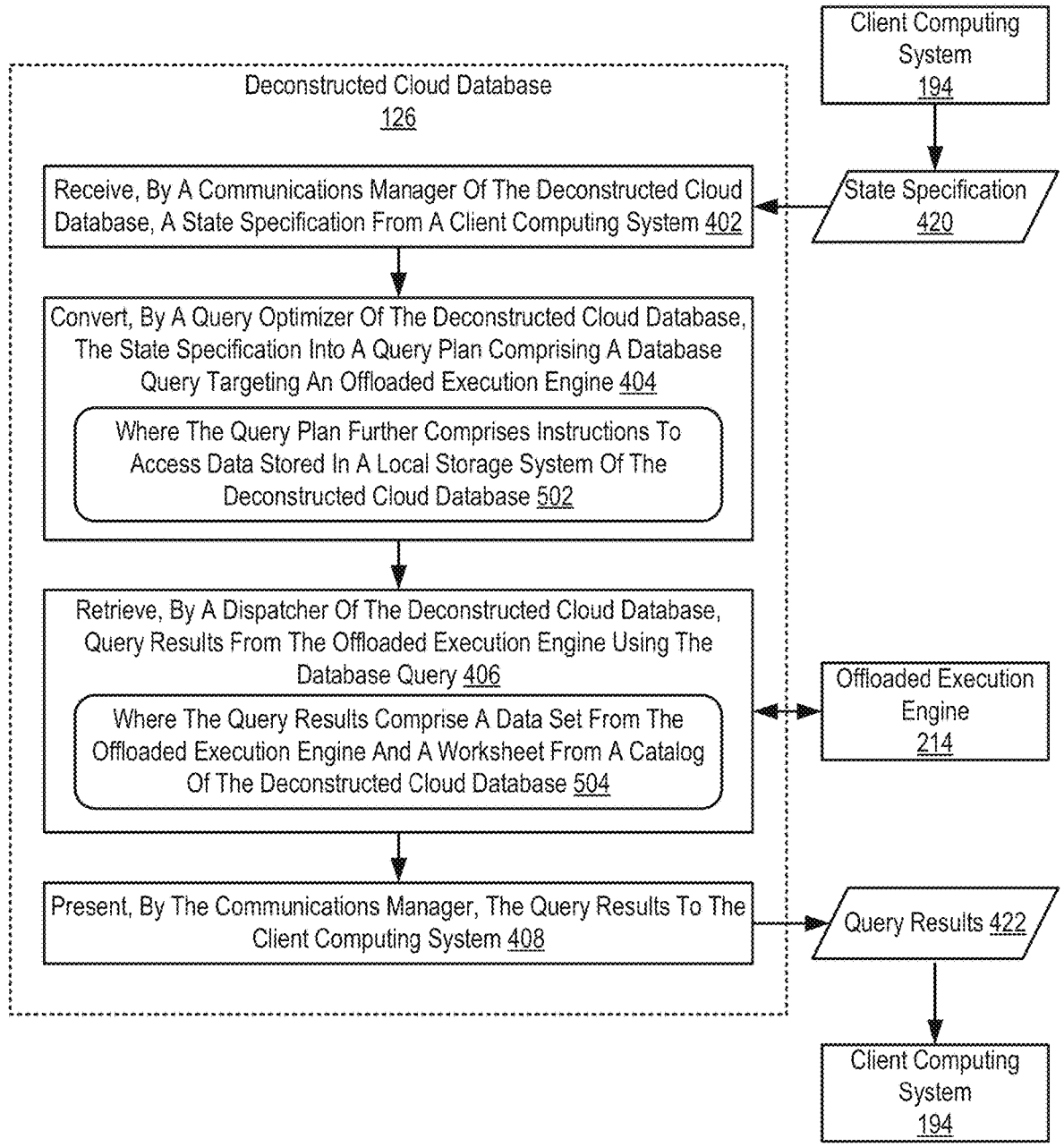
FIG. 5 sets forth a flow chart illustrating an exemplary method for managing database queries using a deconstructed cloud database according to embodiments of the present invention.

For further explanation, FIG. 5 sets forth a flow chart illustrating a further exemplary method for managing database queries using a deconstructed cloud database according to embodiments of the present invention that includes receiving (402), by a communications manager of the deconstructed cloud database (126), a state specification (420) from a client computing system (194); converting (404), by a query optimizer of the deconstructed cloud database (126), the state specification (420) into a query plan comprising a database query targeting an offloaded execution engine (214); retrieving (406), by a dispatcher of the deconstructed cloud database (126), query results (422) from the offloaded execution engine (214) using the database query; and presenting (408), by the communications manager, the query results (422) to the client computing system (194).

The method of FIG. 5 differs from the method of FIG. 4, however, in that converting (404), by a query optimizer of the deconstructed cloud database (126), the state specification (420) into a query plan comprising a database query targeting an offloaded execution engine (214) includes wherein (502) the query plan further comprises instructions to access data stored in a local storage system of the deconstructed cloud database. The query plan may include both instructions to access data stored in the local storage system of the deconstructed cloud database and database query statements targeting the offloaded execution engine (214). Instructions to access data stored in the local storage system of the deconstructed cloud database may include, for example, instructions to retrieve a table or data set from the local storage system, instructions to retrieve a foreign key or join key from the local storage system, instructions to retrieve a calculation column from local storage system, or instructions to retrieve a presentation configuration from the local storage system. Database query statements targeting the offloaded execution engine (214) may include, for example, SQL statements, spark statements, or snowflake statements.

The method of FIG. 5 also differs from the method of FIG. 4 in that retrieving (406), by a dispatcher of the deconstructed cloud database (126), query results (422) from the offloaded execution engine (214) using the database query includes wherein (504) the query results comprise a data set from the offloaded execution engine and a worksheet from a catalog of the deconstructed cloud database. The query results (422) may include data (including objects and presentations) from both the offloaded execution engine (214) and from the local storage of the deconstructed cloud database (126).

Figure 6:
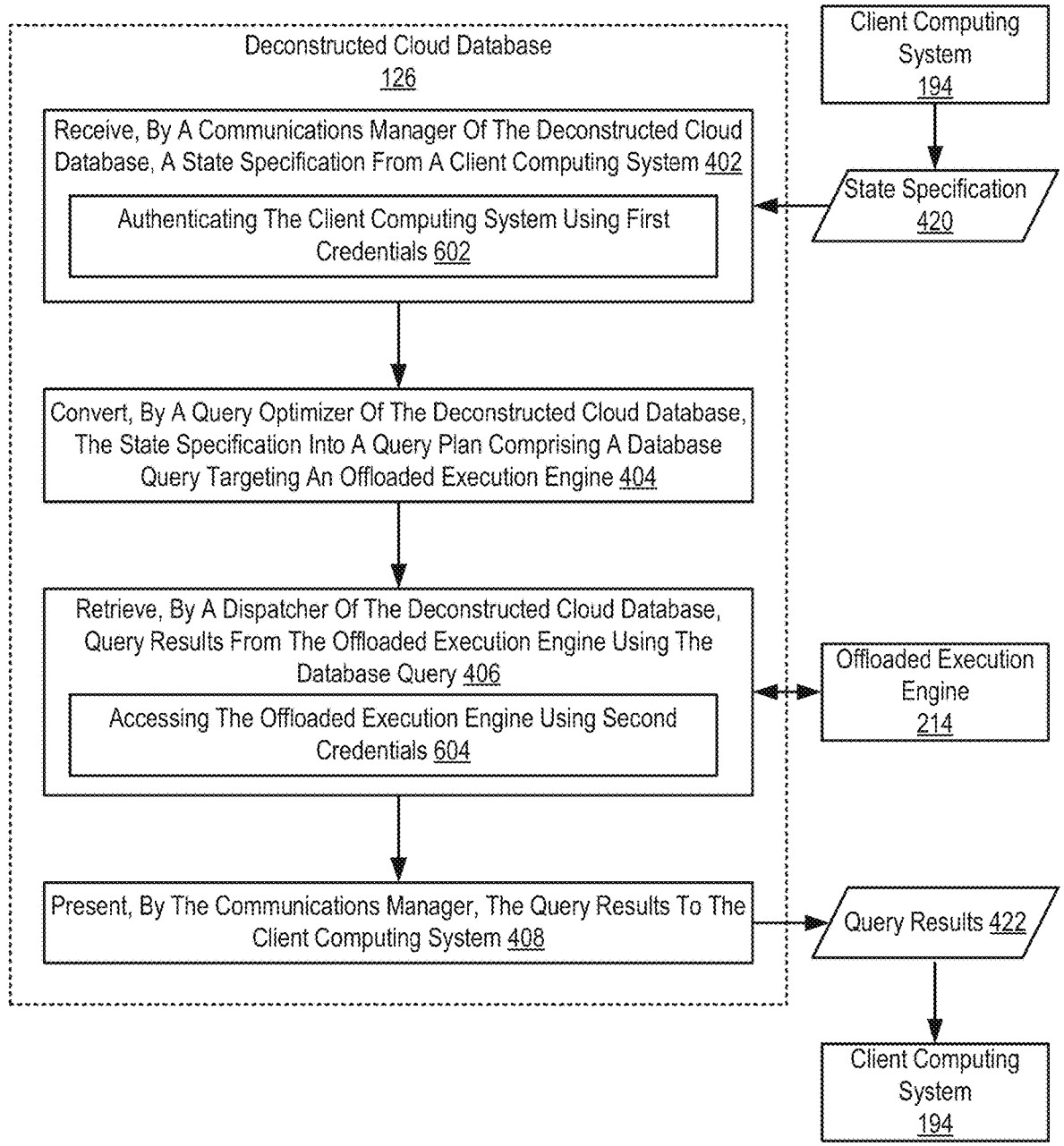
FIG. 6 sets forth a flow chart illustrating an exemplary method for managing database queries using a deconstructed cloud database according to embodiments of the present invention.

For further explanation, FIG. 6 sets forth a flow chart illustrating a further exemplary method for managing database queries using a deconstructed cloud database according to embodiments of the present invention that includes receiving (402), by a communications manager of the deconstructed cloud database (126), a state specification (420) from a client computing system (194); converting (404), by a query optimizer of the deconstructed cloud database (126), the state specification (420) into a query plan comprising a database query targeting an offloaded execution engine (214); retrieving (406), by a dispatcher of the deconstructed cloud database (126), query results (422) from the offloaded execution engine (214) using the database query; and presenting (408), by the communications manager, the query results (422) to the client computing system (194).

The method of FIG. 6 differs from the method of FIG. 4, however, in that receiving (402), by a communications manager of the deconstructed cloud database (126), a state specification (420) from a client computing system (194) includes authenticating (602) the client computing system (194) using first credentials. Authenticating (602) the client computing system (194) using first credentials may be carried out by verifying the first credentials provided by a user of the client computing system. The first credentials may be specific to the user of the computing system and the deconstructed cloud database (126). The first credentials may be authenticated locally by the deconstructed cloud database (126).

The method of FIG. 6 also differs from the method of FIG. 4 in that retrieving (406), by a dispatcher of the deconstructed cloud database (126), query results (422) from the offloaded execution engine (214) using the database query includes accessing (604) the offloaded execution engine (214) using second credentials. Accessing (604) the offloaded execution engine (214) using second credentials may be carried out by the deconstructed cloud database (126) providing the second credentials to the offloaded execution engine (214) to gain access to the offloaded execution engine (214) and retrieve the query results (422). The second credentials may be different than the first credentials. Specifically, the first credentials used by the client computing system (194) to access the deconstructed cloud database (126) may differ from the second credentials used by the deconstructed cloud database (126) to access the offloaded execution engine (214) in order to service the requests made by the client computing system (194).

For example, a user may be given first credentials to access the deconstructed cloud database (126). That user may be part of an organization that accesses the offloaded execution engine (214) using the same second credentials. Once the user is verified as part of the organization, the deconstructed cloud database (126) may then use the organization's second credentials to access the offloaded execution engine (214) to service the user's requests.

Figure 7:
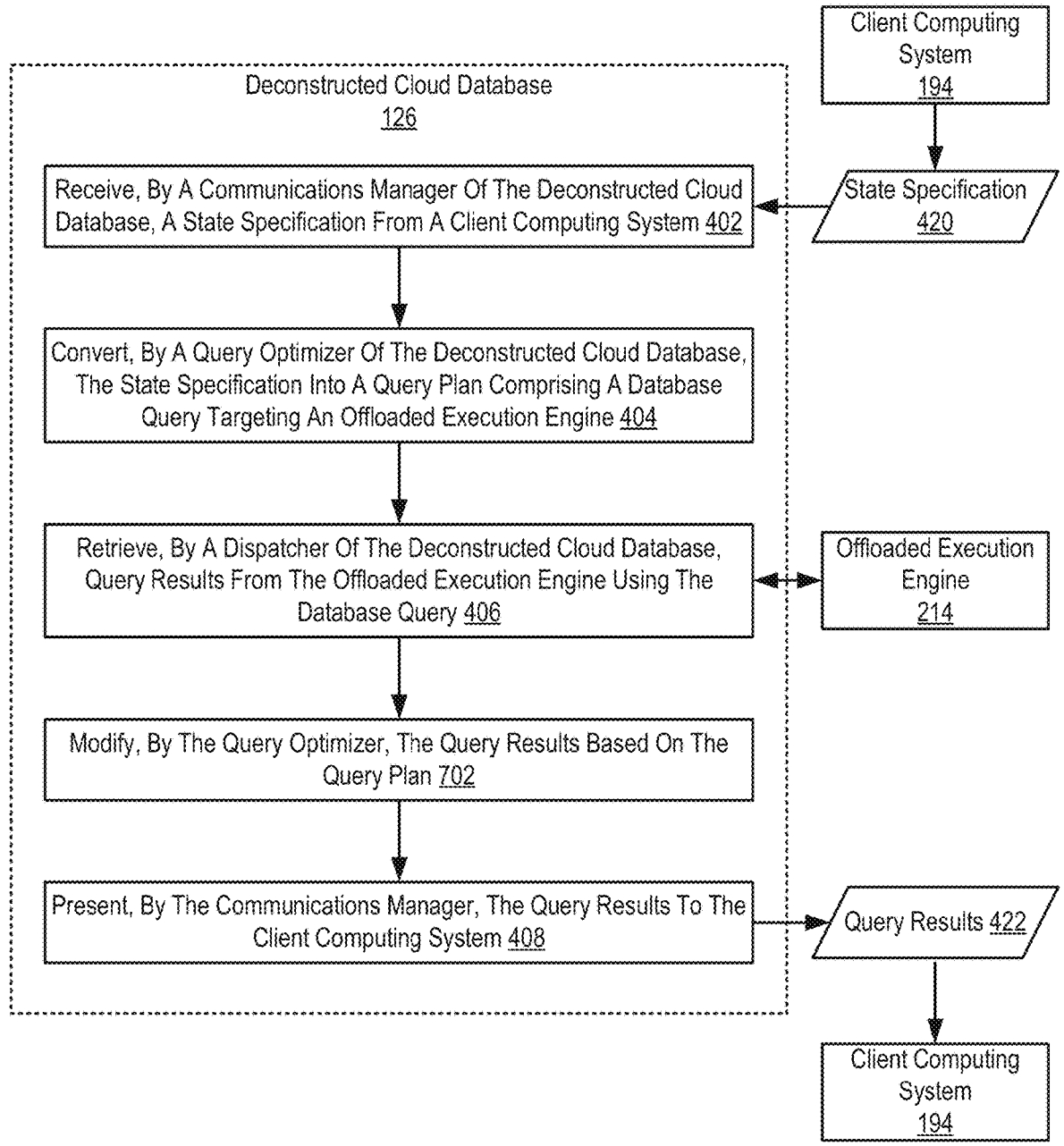
FIG. 7 sets forth a flow chart illustrating an exemplary method for managing database queries using a deconstructed cloud database according to embodiments of the present invention.

For further explanation, FIG. 7 sets forth a flow chart illustrating a further exemplary method for managing database queries using a deconstructed cloud database according to embodiments of the present invention that includes receiving (402), by a communications manager of the deconstructed cloud database (126), a state specification (420) from a client computing system (194); converting (404), by a query optimizer of the deconstructed cloud database (126), the state specification (420) into a query plan comprising a database query targeting an offloaded execution engine (214); retrieving (406), by a dispatcher of the deconstructed cloud database (126), query results (422) from the offloaded execution engine (214) using the database query; and presenting (408), by the communications manager, the query results (422) to the client computing system (194).

The method of FIG. 7 differs from the method of FIG. 4, however, in that the method of FIG. 7 further includes modifying (702), by the query optimizer, the query results (422) based on the query plan. Modifying (702), by the query optimizer, the query results (422) based on the query plan may be carried out by adjusting the query results based on instructions in the query plan. The query results (422) may be, for example, filtered, reordered, and/or added-to based on instructions in the query plan. The additions to the query results (422) may be from data stored in the local storage system of the deconstructed cloud database (126).

In view of the explanations set forth above, readers will recognize that the benefits of managing database queries using a deconstructed cloud database according to embodiments of the present invention include:

Improving the operation of a computing system by providing database services from a system that utilizes an offloaded execution engine, allowing the elements of the database to be tailored for specific client needs, increasing computing system efficiency and functionality.

Improving the operation of a computing system by providing a database that receives requests in the form of state specifications from a user-friendly GUI, and converting the state specification into non-user friendly database queries and other instructions to service the requests, increasing computing system usability and functionality.

Exemplary embodiments of the present invention are described largely in the context of a fully functional computer system for managing database queries using a deconstructed cloud database. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing database queries using a deconstructed cloud database comprising:

receiving, by a communications manager of the deconstructed cloud database, a state specification from a client computing system, wherein the state specification comprises user manipulations of one or more graphical user interface (GUI) elements of a GUI of the client computing system;

converting, by a query optimizer of the deconstructed cloud database, the state specification into a query plan comprising instructions to access data stored on the deconstructed cloud database and a database query targeting an offloaded execution engine within a cloud-based data warehouse;

retrieving, by a dispatcher of the deconstructed cloud database, query results from the offloaded execution engine using the database query and from the deconstructed cloud database using the instructions; and presenting, by the communications manager, the query results on the client computing system.

2. The method of claim 1, wherein the cloud-based data warehouse is in a group of computing systems separate from the deconstructed cloud database, and wherein the state specification is a JavaScript Object Notation specification.

3. The method of claim 1, wherein the query plan further comprises instructions to access data stored in a local storage system of the deconstructed cloud database.

4. The method of claim 1, wherein the query results comprise a data set from the offloaded execution engine and a worksheet from a catalog of the deconstructed cloud database.

5. The method of claim 1,
wherein receiving, by the communications manager of the deconstructed cloud database, the state specification from the client computing system comprises authenticating the client computing system using first credentials, and
wherein retrieving, by the dispatcher of the deconstructed cloud database, the query results from the offloaded execution engine using the database query and from the deconstructed cloud database using the instructions comprises accessing the offloaded execution engine using second credentials.

6. The method of claim 1, wherein converting, by the query optimizer of the deconstructed cloud database, the state specification into the query plan comprises selecting a database query language based on a protocol of the offloaded execution engine.

7. The method of claim 1, further comprising modifying, by the query optimizer, the query results based on the query plan, and wherein the query plan further comprises instructions to access data stored in a local storage system of the deconstructed cloud database.

8. A deconstructed cloud database comprising:
a communications manager configured to receive a state specification from a client computing system and present query results to the client computing system, wherein the state specification comprises user manipulations of one or more graphical user interface (GUI) elements of a GUI of the client computing system;
a query optimizer configured to convert the state specification into a query plan comprising instructions to access data stored on the deconstructed cloud database and a database query targeting an offloaded execution engine within a cloud-based data warehouse; and
a dispatcher configured to retrieve the query results from the offloaded execution engine using the database query and from the deconstructed cloud database using the instructions.

9. The deconstructed cloud database of claim 8, wherein the cloud-based data warehouse is in a group of computing systems separate from the deconstructed cloud database.

10. The deconstructed cloud database of claim 8, wherein the query plan further comprises instructions to access data stored in a local storage system of the deconstructed cloud database.

11. The deconstructed cloud database of claim 8, wherein the query results comprise a data set from the offloaded execution engine and a worksheet from a catalog of the deconstructed cloud database.

12. The deconstructed cloud database of claim 8,
wherein receiving the state specification from the client computing system comprises authenticating the client computing system using first credentials, and
wherein retrieving the query results from the offloaded execution engine using the database query and from the deconstructed cloud database using the instructions comprises accessing the offloaded execution engine using second credentials.

13. The deconstructed cloud database of claim 8, wherein converting the state specification into the query plan comprises selecting a database query language based on a protocol of the offloaded execution engine.

14. The deconstructed cloud database of claim 8, wherein the query optimizer is further configured to modify the query results based on the query plan.

15. An apparatus for managing database queries using a deconstructed cloud database, the apparatus comprising a computer processor, a computer memory operatively coupled to the computer processor, the computer memory having disposed within it computer program instructions that, when executed by the computer processor, cause the apparatus to carry out the steps of:
receiving, by a communications manager of the deconstructed cloud database, a state specification from a client computing system, wherein the state specification comprises user manipulations of one or more graphical user interface (GUI) elements of a GUI of the client computing system;
converting, by a query optimizer of the deconstructed cloud database, the state specification into a query plan comprising instructions to access data stored on the deconstructed cloud database and a database query targeting an offloaded execution engine within a cloud-based data warehouse;
retrieving, by a dispatcher of the deconstructed cloud database, query results from the offloaded execution engine using the database query and from the deconstructed cloud database using the instructions; and
presenting, by the communications manager, the query results on the client computing system.

16. The apparatus of claim 15, wherein the cloud-based data warehouse is in a group of computing systems separate from the deconstructed cloud database.

17. The apparatus of claim 15, wherein the query plan further comprises instructions to access data stored in a local storage system of the deconstructed cloud database.

18. The apparatus of claim 15, wherein the query results comprise a data set from the offloaded execution engine and a worksheet from a catalog of the deconstructed cloud database.

19. The apparatus of claim 15,
wherein receiving, by the communications manager of the deconstructed cloud database, the state specification from the client computing system comprises authenticating the client computing system using first credentials, and
wherein retrieving, by the dispatcher of the deconstructed cloud database, the query results from the offloaded execution engine using the database query and from the deconstructed cloud database using the instructions comprises accessing the offloaded execution engine using second credentials.

20. The apparatus of claim 15, wherein converting, by the query optimizer of the deconstructed cloud database, the state specification into the query plan comprises selecting a database query language based on a protocol of the offloaded execution engine.

* * * * *